(12) United States Patent
Ghali et al.

(10) Patent No.: US 8,903,229 B2
(45) Date of Patent: *Dec. 2, 2014

(54) UNIVERSAL UNDERWATER ENCLOSURE FOR CAMERAS AND CAMCORDERS

(71) Applicant: SalamanderSkinz, LLC, Washington, DC (US)

(72) Inventors: Peter Ghali, Washington, DC (US); Jay Huntington, Crownsville, MD (US)

(73) Assignee: SalamanderSkinz, LLC, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/083,428

(22) Filed: Nov. 18, 2013

(65) Prior Publication Data

US 2014/0079378 A1   Mar. 20, 2014

Related U.S. Application Data

(63) Continuation of application No. 13/427,522, filed on Mar. 22, 2012, now Pat. No. 8,588,596, which is a continuation of application No. 12/831,204, filed on Jul. 6, 2010, now Pat. No. 8,155,510.

(51) Int. Cl.
   *G03B 17/08* (2006.01)

(52) U.S. Cl.
   CPC ..................................... *G03B 17/08* (2013.01)
   USPC ........................................................... 396/27

(58) Field of Classification Search
   CPC .............................. G03B 17/02; G03B 17/08
   USPC ......................................... 396/25–29; 348/81
   See application file for complete search history.

(56) References Cited

U.S. PATENT DOCUMENTS

2009/0110380 A1* 4/2009 Fantone et al. ................. 396/27

* cited by examiner

*Primary Examiner* — WB Perkey
*Assistant Examiner* — Minh Phan
(74) *Attorney, Agent, or Firm* — Symbus Law Group, LLC; Clifford D. Hyra

(57) ABSTRACT

A universal underwater enclosure has a spherical shell having a hollow in which a camera, camcorder, or other device can be inserted, a lens attached to the shell that can be opened to insert a device, and glove assemblies extending into the hollow for manipulation of a device placed therein. The glove assemblies have fingers and not full gloves, reducing the dimensions of the enclosure—thereby minimizing buoyancy. A mounting system attaches to a device's tripod mount receptor, fixes the device, and allows it to be adjusted in three dimensions. A pressure equalization system relieves stress on the enclosure, which exhibits neutral buoyancy. A flash mounted on the shell operates independently of any device. Modular lens pods replace the lens to accommodate various other lenses. The glove assemblies have perimeter lips secured to the shell by fasteners and a bezel around teardrop-shaped cut-out holes in the shell. The fingers allow access to all of a device's controls.

19 Claims, 12 Drawing Sheets

Rear View

Front View

Bottom View

Top View

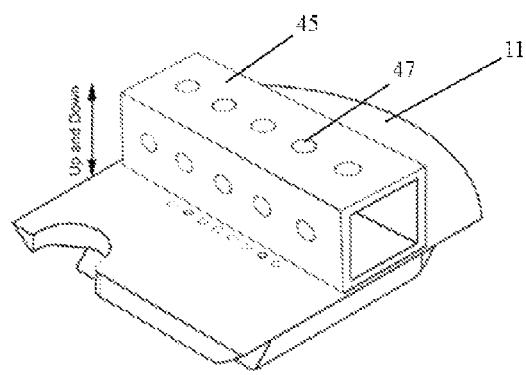
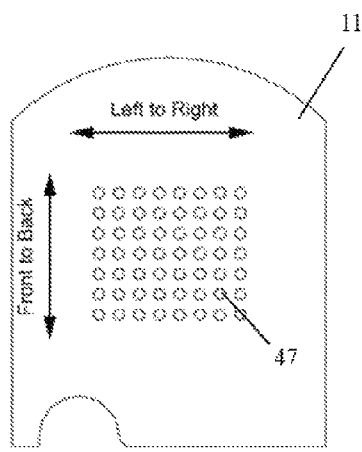
FIG. 19A  FIG. 19B
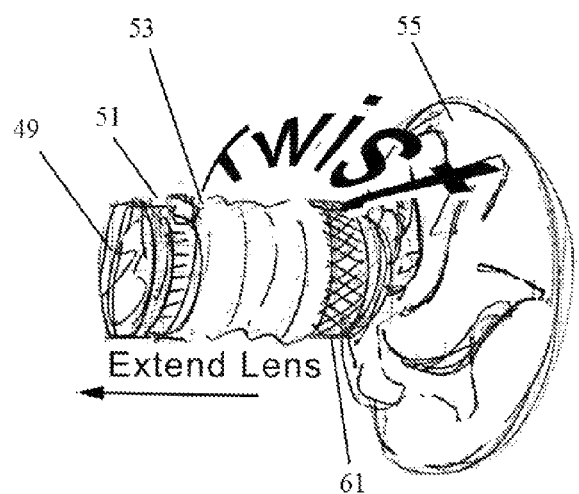
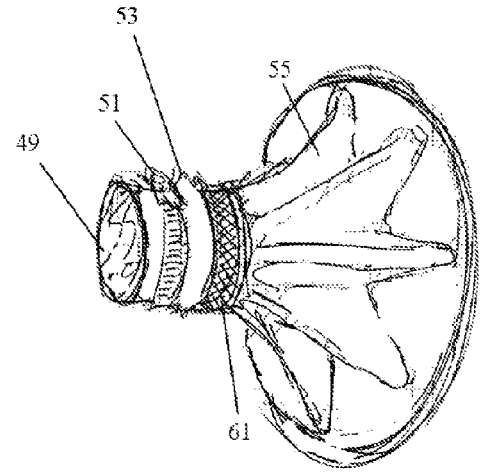
FIG. 20A  FIG. 20B

UNIVERSAL UNDERWATER ENCLOSURE FOR CAMERAS AND CAMCORDERS

CROSS-REFERENCE TO RELATED APPLICATIONS

This application is a continuation of United States utility patent application Ser. No. 13/427,522 filed Mar. 22, 2012, which is a continuation application of United States utility patent application Ser. No. 12/831,204, filed Jul. 6, 2010, now issued U.S. Pat. No. 8,155,510, which are hereby incorporated by reference herein in their entirety.

BACKGROUND OF THE INVENTION

The present invention relates generally to underwater photography equipment and SCUBA diving equipment.

There are several classes of waterproof camera housings. Plastic housings are the most common. They make use of external mechanical buttons, levers, and dials that correspond to their respective controls on the digital camera. Plastic housings tend to be bulky, and are not ideal for out-of-water use. They average from $200 to $500. Their expense is largely attributable to their design. These housings often contain many parts that must be custom-designed for each camera. Each target camera tends to have a short life span in the market before being replaced by a newer, more feature-rich model, rendering the associated housing obsolete.

Vinyl bags can be used with a range of cameras and tend to be affordable (ranging from $30 to $200). The stiff vinyl material makes underwater operation difficult. At depths exceeding 10 feet, water pressure tends to simultaneously depress the buttons on the camera—a phenomenon that sometimes actuates the shutter unintentionally or causes the camera to malfunction.

Metal housings are targeted to professional photographers and those who can afford their expense. They are usually made for digital SLR style cameras. Entry into this market of camera housings begins at $1,000, but can exceed $20,000 for specialized underwater videography equipment. Prices of $2,000 to $4,000 are most common.

One line of silicone skins for camera equipment allows shallow-water use of one specific camera. These designs do not include a glove, and have no pressure equalization.

Needs exist for improved waterproof and underwater camera housings.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In certain embodiments, the disclosed embodiments may include one or more of the features described herein.

A new universal underwater enclosure has a shell having a hollow in which a camera, camcorder, or other device can be inserted and a transparent viewing area in the shell through which photographs can be taken. One or more glove assemblies is attached to the shell and includes a portion extending into the hollow of the shell. A glove assembly allows a user to manipulate a device placed therein without opening the shell. The portion of the glove assemblies extending into the hollow of the shell includes fingers, is not a full glove and does not encompass a user's entire palm, so that the amount of unused space within the hollow of the shell is minimized, reducing buoyancy.

In one embodiment, a mounting system fixes the position of a device in the hollow of the shell and attaches to a tripod mount receptor and allows for adjustment of the device position up and down, left and right, and forward and back. A tripod mount adapter can be used to clamp to a device body and present a tripod mount receptor for attaching to the mounting system.

In one embodiment, the shell is spherical. In one embodiment a pressure equalization system is attached to the shell and maintains an internal shell air pressure equivalent to the external water pressure. The pressure equalization system in one embodiment includes a carbon dioxide reservoir, a high-pressure regulator, and a low-pressure valve that releases gas from the carbon dioxide reservoir to increase internal shell air pressure. In some embodiments, an air-restricting orifice is used in lieu of a regulator. Conversely, the system contains a purge valve that releases excess internal air pressure when the internal air pressure exceeds the outside water pressure (such will be the case during ascent from a dive).

In one embodiment, conductive material is incorporated into the fingertip of one or more of the glove assembly fingers, allowing a user to manipulate touch screens that are based on resistive, capacitive, or surface acoustic technologies, inside the hollow of the shell.

In one embodiment, the enclosure exhibits neutral buoyancy. In one embodiment a flash is attached to the shell and operates independently of any device placed in the hollow of the shell. In one embodiment the flash system includes LED lights and an external button for triggering the flash and is powered by an energy storage device.

In one embodiment, modular lens pods replace all or a portion of the transparent viewing area and accommodate various lenses. In one embodiment, the transparent viewing area is an optical lens. In one embodiment, the shell is made of clear polycarbonate plastic.

In one embodiment, one or more hand shrouds cover one or more of the glove assemblies, protect the glove assemblies and provide a rigid external surface upon which to grab.

In one embodiment, there are fasteners and a bezel around one or more cut-out holes in the shell and the glove assemblies have perimeter lips that are secured to the shell by the bezel and the fasteners. In one embodiment the cut-out holes are teardrop-shaped. In one embodiment, the cut-out holes are covered and sealed by the glove assemblies, one or more of the fingers extend into the hollow of the shell at the side of the cut-out nearest a front of the shell and the fingers include a thumb that extends into the hollow of the shell at the side of the cut-out nearest a back of the shell, providing sufficient range of motion to a user to accommodate all of a device's controls.

In one embodiment, clasps secure the optical glass lens to the shell. The optical glass lens is attached to the shell in a hinged manner and the optical glass lens can be moved to an open position to allow a device to be inserted into the hollow in the shell through the resulting opening. In one embodiment, an access panel attached to the shell in a hinged manner can be opened to insert a device into the hollow in the shell.

In one embodiment, the fingers consist of two fingers corresponding to a user's index finger and thumb.

A new universal underwater enclosure has a spherical shell having a hollow in which a camera, camcorder, or other device can be inserted, an optical glass lens attached to the shell in a hinged manner so that the optical glass lens can be moved to an open position to allow a device to be inserted into the hollow in the shell through a resulting opening, a clasp securing the optical glass lens to the shell, and one or more glove assemblies attached to the shell including a portion extending into the hollow of the shell, which allows a user to manipulate a device placed therein without opening the shell. The portion extending into the hollow of the shell includes fingers, and is not a full glove and does not encompass a user's entire palm, minimizing the amount of unused space within the hollow of the shell and reducing buoyancy.

A mounting system fixes the position of a device in the hollow of the shell, attaches to a tripod mount receptor in a device and allows adjustment of the device directionally—up and down, left and right, and forward and back.

A pressure equalization system attached to the shell includes a carbon dioxide reservoir and pressure valve that releases gas from the carbon dioxide reservoir to increase internal shell air pressure in order to maintain an internal shell air pressure equivalent to external water pressure. The enclosure exhibits neutral buoyancy.

A flash includes LED lights, an energy storage device, and an external button for triggering the flash attached to the shell and operating independently of any device placed in the hollow of the shell.

Modular lens pods replace all or a portion of the optical glass lens to accommodate various lenses. The glove assemblies have perimeter lips, which are secured to the shell by a bezel around one or more teardrop-shaped cut-out holes in the shell and fasteners. The cut-out holes are covered by the glove assemblies and one or more of the fingers extend into the hollow of the shell at the side of the cut-out nearest a front of the shell. The fingers include a thumb that extends into the hollow of the shell at the side of the cut-out nearest a back of the shell, allowing sufficient range of motion to a user to accommodate all of a device's controls.

These and other objectives and features of the invention are apparent in the disclosure, which includes the above and ongoing written specification.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art.

FIG. 19A is a detail perspective view of a mounting system.

FIG. 19B is a detail top view of a mounting system.

FIGS. 20A and B are side perspective views of a telephoto lens accessory.

DETAILED DESCRIPTION

Figure 1:
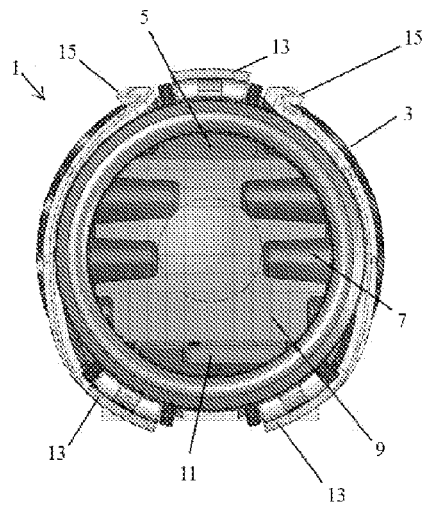
FIG. 1 is a front view of a universal underwater camera enclosure with an inserted camera.
Figure 2:
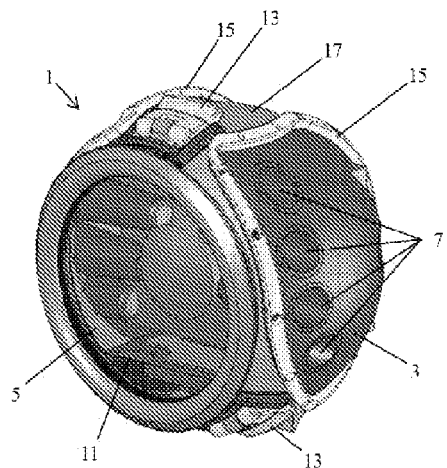
FIG. 2 is a trimetric view of a universal underwater camera enclosure with an inserted camera.

An improved universal underwater enclosure for cameras and camcorders will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail.

A new kind of "one size fits all" housing for the underwater photography and videography market is both affordable and capable, being approximately the price of a prior art plastic housing but with many of the desirable features of metal housings and many additional features not previously available. Most devices have enough mass and displace a sufficient amount of air to cause the housing to be neutral or negatively buoyant. The housing functions properly under either of these circumstances. If necessary, an operator decreases buoyancy by inserting weights within the bottom of the housing. With a pressure equalization system, normal operations are possible to at least 100 feet, the legal limit of a recreational diver.

A single housing accommodates everything from the most compact digital camera, to large sophisticated digital SLR cameras with massive lenses. In some embodiments the housing works for digital SLR cameras as large as 132×103×77 mm (5.2×4.1×3 in), which are the dimensions of the Nikon D90 camera.

Although a one-size universal housing can accommodate most types of cameras, different sizes of housings in certain embodiments offer a balance between maximum versatility, accommodating as many different cameras as possible, and minimum buoyancy resulting from unused interior space. A much larger housing allows large video cameras or other devices to be placed inside.

In some embodiments a spherical housing is made of clear polycarbonate or acrylic plastic using injection molding. A rigid, shatter-resistant material that is anti-corrosive, transparent, and can withstand temperature changes of 30 to 80 degrees works well for the application. Some parts of the housing, particularly mounting hardware such as screws, hinges, bezels, springs, and internal latch components, are in some embodiments made of metal having non-corrosive properties. In one embodiment a ball-shaped housing made of polycarbonate plastic has silicone gloves and an optical quality glass lens and has a 7.5" diameter.

In alternative embodiments, the gloves are made of a rubber, latex, or another non-permeable membrane that resists tearing and puncturing and presents sufficient elasticity to allow an operator to feel the presence of, and manipulate controls on an electronic device. The lens presents optical quality transparency and in some embodiments is polycarbonate plastic. Describing the housing as "spherical" means that the general overall shape of the housing as perceived by the human eye is spherical, i.e. ball-shaped. The lens is dome-shaped or flat, and if dome-shaped possesses optical characteristics that compensate for the distortion of light caused by the curvature of the dome. The spherical shape adds strength to withstand water pressure at deep submersion. The spherical shape is also key in making the housing universal to all cameras. No other spherical housings exist in the digital camera/camcorder market.

In lieu of mechanical buttons, inward-facing glove assemblies sealed to the housing, referred to as "gloves", provide direct access to the camera controls (see figures). The glove assemblies are typically located on the sides of the housing The gloves are made of thick silicone rubber or latex or similar material, while an outer glove shroud is a hard rubber or plastic compound.

Figure 18:
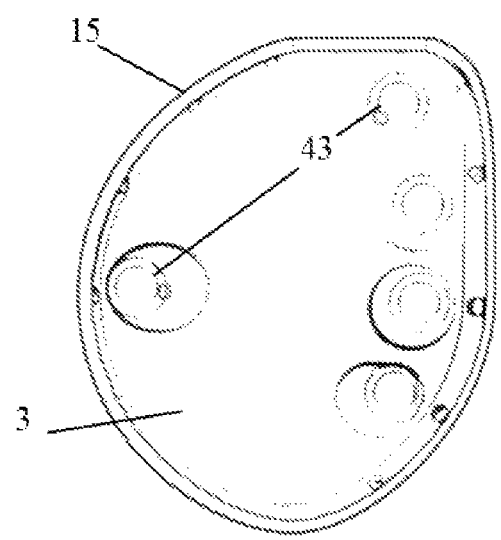
FIG. 18 is a side view of a universal underwater camera enclosure showing conductive contacts.

The outer shroud functions as a rigid handle when grasping the housing underwater. For example, one hand can be in a glove, while the other hand grasps the outer shroud. The hand shroud protects the glove and provides an external surface upon which to grab, and maintains an aesthetic spherical shape. In some embodiments the shroud is omitted and the glove establishes the spherical shape on its own. Glove access accommodates all fingers. No other housings currently on the market feature inward facing gloves for access to camera controls. In one embodiment, a conductive surface material is embedded in the tip of one or more fingers of the glove, affecting the electrical field upon which the touch screen operates and allowing the camera to be manipulated. The conductive material may be placed in a dot at the tip of one or more fingers. FIG. 18 is a side view of a universal underwater camera enclosure's glove assembly showing conductive contacts 43 in the tip of the index finger and thumb of the glove 3.

A rigid plastic bezel secures the glove to the housing body along a lip in the perimeter of the glove. Stainless steel screws around the perimeter of the bezel are used to secure the glove to the housing body and create a watertight seal. Other attachment mechanisms are possible, but screws are easily removable and allow the gloves to be replaced in the event of tearing or rot.

When in operation, the interior surface of the glove is exposed to water, but the exterior surface of the glove (which is in contact with the camera) remains dry inside the housing. Special tear-shaped cutouts on the side of the plastic housing form the opening for the gloves. The teardrop shape is the result of a comprehensive analysis of various cameras, and the range of motion that is required to manipulate them inside a spherical housing. The cutouts are designed to provide access to 3 primary "zones" on a camera. Top-right, where the shutter button and telephoto controls are usually located, back-right, where menu options and joy-stick style controls are usually situated, and the back, where a touch-sensitive screen may be present.

The cutouts must accommodate at a minimum an index finger and thumb, and more commonly all 5 fingers. Therefore, the dimensions of the cutout may range from 2-6 inches, depending upon the number of fingers to be accommodated. By allowing the operator's fingers and thumbs into the housing, the design allows enough range of motion to accommodate all of the camera's controls, regardless of the camera model.

Figure 21:
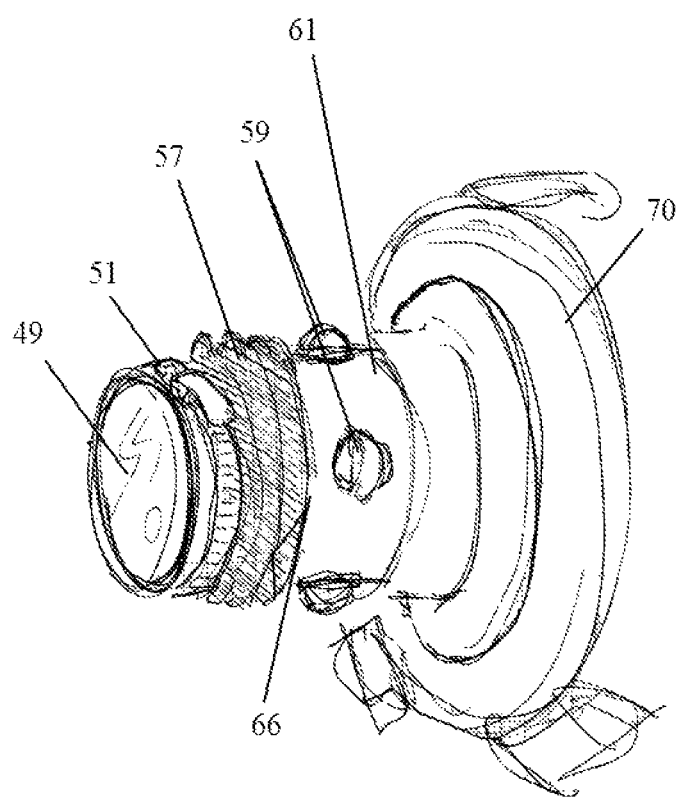
FIG. 21 is a side perspective view of a telephoto lens accessory.

Some housing embodiments feature a modular design of "lens pods". Lens pods are extenders that accommodate a variety of lenses, including wide angle and telephoto lenses. All or a portion of the lens assembly can be removed and replaced with a larger pod to accommodate different lenses. FIGS. 20A, 20B, and 21 show lens pods. FIGS. 20A and B are side perspective views of a telephoto lens accessory. Lens 49, in one embodiment made of glass, is secured with a clamp 51 to an accordion style rubber boot 53, which in turn is attached to a ribbed rubber base 55 that twists freely, allowing a user to operate a lens inside the lens pod by grasping the rotatable collar 61 and twisting as shown in FIG. 20A. When the collar is released, it rotates free of the lens and the base returns to its relaxed position.

FIG. 21 is a side perspective view of an alternative telephoto lens accessory where rubber boot 57 is attached to a rotatable collar 61 having elastic dimples 59 that grab a lens inside the lens pod and allow the lens to be operated by rotating the collar 61. The elastic (e.g. rubber) dimples in the collar allow a user to make contact with the lens body during rotation, and subsequently release contact with the lens. When the dimples are not pressed against the lens, the collar 61 rotates freely. The collar is attached to the base 70 with a watertight seam 68, allowing the collar to rotate freely without water entering the lens pod. A watertight seam 66 also joins the collar 61 and boot 57 in some embodiments, allowing the collar to rotate without rotating the boot 57 or lens 49.

Various methods are used in various embodiments to extend and retract the accordion style boot 53, 57 when the lens is extended or retracted. In some embodiments, the extension and retraction are performed manually by a user, while in other embodiments a mechanical link between the lens and lens pod automatically extends or retracts the lens pod with the lens. To avoid placing too great a load on the lens, manual extension and retraction is used, or in some embodiments an automated system that detects rotation of the collar or lens and responds by extending or retracting the lens pod appropriately.

Figure 22:
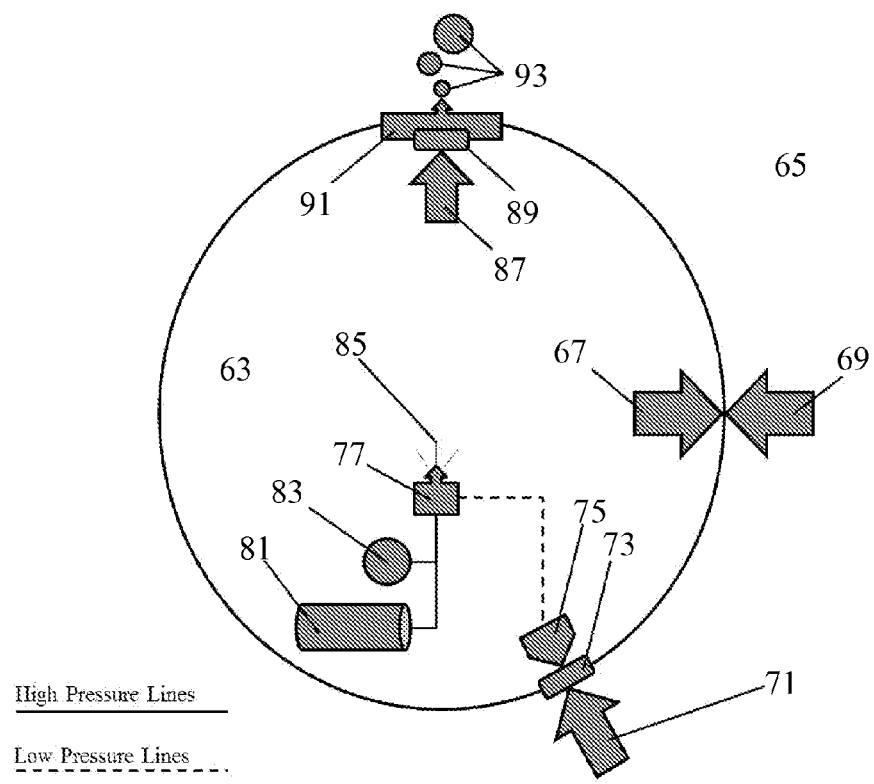
FIG. 22 is a diagram illustrating a housing pressurization system.
Figure 23:
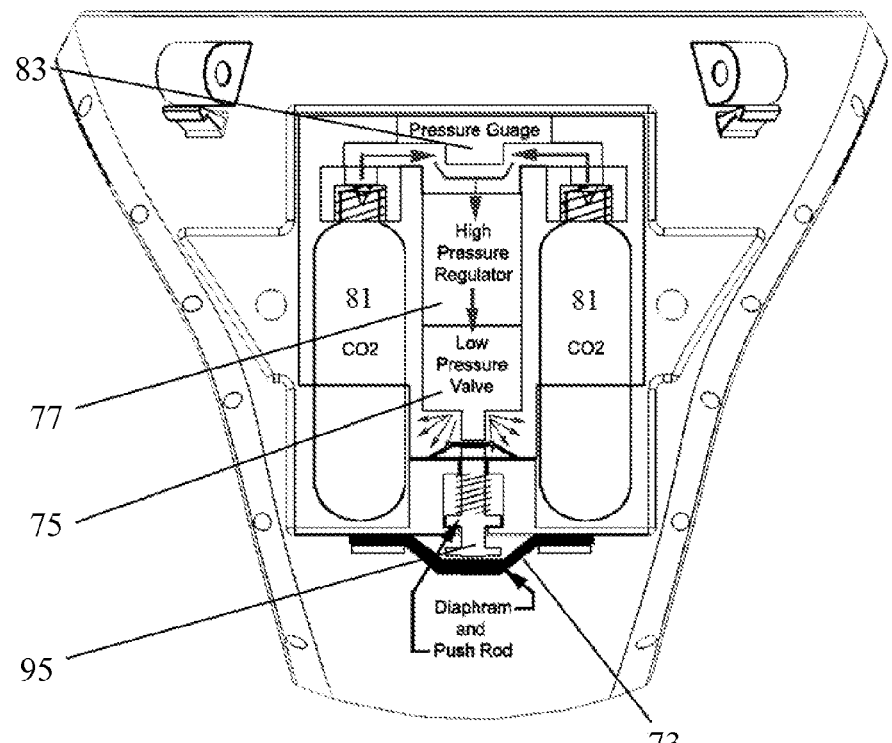
FIG. 23 is a bottom view illustration of a housing pressurization system.

A key design element in this housing is the system for equalization of water pressure. Some embodiments contain a pressure system that maintains an internal air pressure that is equivalent to the force of the external water pressure. FIGS. 22 and 23 illustrate a housing pressurization system. An elastic diaphragm 73 (made for example of rubber or silicone), affixed to the shell of the housing, bows inward when external water pressure 69 exceeds internal air pressure 67. The movement of the rubber diaphragm 73 actuates a low pressure valve 75 that is positioned inside the housing, adjacent to the diaphragm 73. The actuation of the pressure valve 75 releases gas 85 from a carbon dioxide (CO2) reservoir 81 contained within the housing. Other gases could be used, but for example oxygen is more expensive and less compressible than CO2. In some embodiments, the carbon dioxide reservoir is substituted or combined with an interface to a diver's oxygen-filled scuba tank, or external "pony" bottle (small scuba bottle, often worn strapped to a leg). The pressurization system in some embodiments is connected to the scuba tank by an adapter connected to the scuba tank spare line ("octopus").

A high pressure regulator 77 reduces the amount of gas 85 escaping from the CO2 cartridges 81 to approximately 20 psi. Pressure gauge 83 indicates ambient internal air pressure. The released air equalizes the internal pressure 67 of the ball to match the external pressure 69 of the water. When the internal and external pressure are equal, the diaphragm 73 returns to its relaxed state, and ceases to depress the actuator on the low pressure valve 75. With internal pressure equalized to the external water pressure, the gloves function normally and stresses on the shell of the ball are virtually eliminated. The system can utilize a commercial off-the-shelf regulator 77 and pressure gauge 83.

Purge valve 91 releases excess internal air pressure when the internal air pressure 67 exceeds the outside water pressure 69 (such will be the case during ascent from a dive). In this case, excess internal air pressure 87 exerts a force on diaphragm 89, moving the diaphragm 89 and activating purge valve 91 to release gas 93 from the interior of the housing 63 out into the water 65.

In the embodiment of FIG. 23, movement of the diaphragm 73 moves push rod 95 to activate low pressure valve 75.

The camera is inserted into the housing by unlatching a clasp and swinging open the front lens assembly or an access panel along a hinged axis. In one embodiment, the lens assembly includes a lens with a lip, where the lip is sandwiched between two bezels secured to each other with screws, which are made of, for example, stainless steel. The camera is secured to the housing via the camera's tripod mount receptor. If a camera does not have a tripod mount receptor (as is sometimes the case in ultra-compact cameras), an optional tripod mount adapter clamps to the camera body and exposes a tripod mount receptor.

A mounting system on the interior floor of the housing allows for adjustment of the camera position along the X-Y-Z axes (forward and back, left and right, and up and down) so that the camera is positioned as desired (for example with the LCD window and lens aligned with their respective windows in the housing). Windows are used in some embodiments of the housing where less than the entire shell is clear, and also in some embodiments with viewfinder windows that magnify the image in the camera's viewfinder.

FIGS. 19A and 19B are detail views of a mounting system. Various mounting holes 47 in the platform 11 allow the camera to be positioned forwards and backwards, left and right, and with riser block 45, having additional mounting holes 47, up and down as well. The riser block in some embodiments is wider than it is tall, providing three possible height settings—no riser, narrow riser, and tall riser. The holes are not to scale. The platform 11 snaps into the housing and a latch pops it out for removing the camera and adjusting the mounting system. A screw enters from the bottom of the platform, extends through the tripod mount receptor, and is secured in the camera's tripod receptor. Once a camera is appropriately positioned in the mounting system, further adjustment is not typically necessary.

Figure 3:
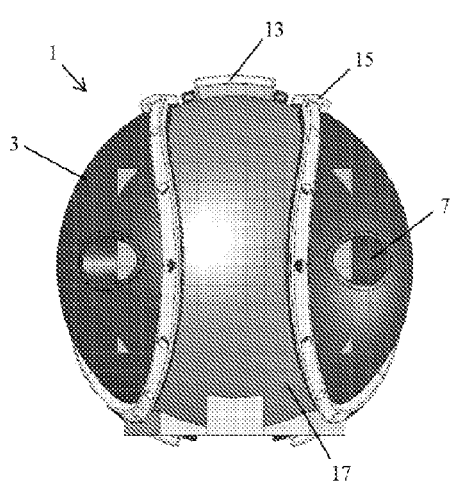
FIG. 3 is a rear view of a universal underwater camera enclosure with an inserted camera.
Figure 4:
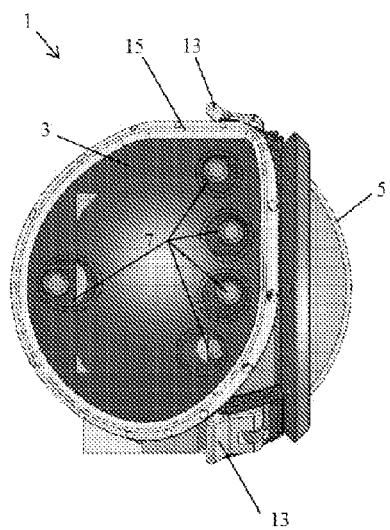
FIG. 4 is a side view of a universal underwater camera enclosure with an inserted camera.

FIGS. 3 and 4 illustrate the glove assembly. In addition to allowing access to the camera controls, the glove assemblies minimize buoyancy of the housing. Water is permitted to enter the interior of the glove assemblies.

The housing in some embodiments provides its own flash capability. The flash is in some embodiments operated independently of camera operation. The flash in one embodiment is implemented with a series of LED lights, which are pop-up or stationary. In other embodiments other types of lights are used. A flash mounted directly on the housing has a disadvantage in that it can cause backscatter, where reflections from particles in the water interfere with the picture. For that reason, external flashes are often used that can be directed at the target from another angle. In some embodiments the housing includes one or more ports on the top of the housing, or elsewhere, through which a through-the-lens (TTL) cable, also called a sync cable, can extend. This sync cable synchronizes an external flash with the operation of the camera. The sync cable can connect directly through a wired connection with the camera to detect camera operation, or can function with fiber optics by detecting the camera flash.

In one embodiment, the housing has a bulkhead for a TTL cable that actuates external after-market strobes. In one embodiment, a digital camera's internal flash is disabled when used in conjunction with the housing in order to avoid flushing the housing's lens with light and producing a white haze effect. In other embodiments, a rubber seal or other device is used to contain light from the camera's flash within a confined area. Some TTL cables are fiber optic and rely on the camera's flash for a signal, so in some embodiments where TTL cables are used the camera flash is not disabled. Some existing underwater housings subdue the camera's built-in flash with a silicone-based panel known as a flash-diffuser, and such a diffuser is used in some embodiments. Some embodiments of this housing provide their own flash mechanisms that are triggered manually by the operator, and remain lit for a period of time after activation. This period of time is configurable.

In some embodiments LED lights mounted on the top and bottom of the front face provide the housing's flash capability. Lights are powered through a battery compartment located within the camera housing. An external, rubberized, water-sealed button functions as the flash trigger button. The flash trigger allows the operator to activate the flash for a period of time before going dim. This period of time in some embodiments is configurable. The flash trigger button in one embodiment is positioned on the carrying handle, on the left-hand side of the housing.

The terms "right-hand side" and "left-hand side" are relative to the back view of the camera. For example, the shutter button of most cameras is on the "right-hand side". In certain embodiments tailored for small and medium sized models, only index finger and thumb operation is supported. By allowing the operator's index finger and thumb into the housing, the design allows enough range of motion to accommodate all of the camera's controls. Since every camera is designed for right-hand use, all compact cameras are compatible with this design. In small and medium housings, the operator's remaining fingers (other than index finger and thumb), grasp the outside right-hand edge of the housing body. This outer edge features a contoured grip (horned-edge). The contoured grip and carrying handle provide opposing forces needed to maneuver the camera housing in an underwater environment.

SLR cameras require more sophisticated control. Therefore, an embodiment for large models provides a glove that accommodates all digits (fingers). This model features a modular design of "lens pods" extenders that accommodate a variety of lenses.

Visually, the housing designs convey two messages of importance: quality and theme. The housing has precise fit and structural rigidity, instilling confidence that the product will not leak, break, or contort when submerged. Although there are business applications for the housings, the look is targeted to a vacationer's lifestyle, using visual design queues to reinforce that image and featuring colors (red, yellow, black) and rubber textures that are suggestive of both "Scuba" and "Photography".

In some embodiments, the inward-facing glove offers sufficient range of motion to manipulate the entire right hand within the embodiment.

The elastic gloves, pressure equalization system, and spherical shape of the new housing render it much more practical than products in the prior art using a vinyl bag to access a camera's features.

Figure 17:
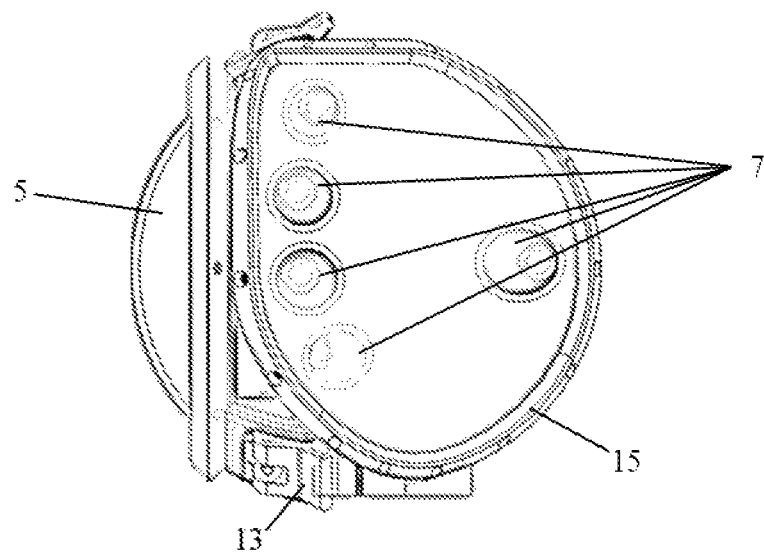
FIG. 17 is a detail side view of a universal underwater camera enclosure showing a left hand glove bezel.

FIGS. 1-4 are a front view, trimetric view, rear view, and side view, respectively, of a universal underwater camera enclosure 1 with an inserted camera 9. Lens 5 is secured tightly to the shell 17 with clasps 13, which can be released to open the lens for camera insertion. Gloves 3 with fingers 7 are secured to the shell 17 by bezel 15. The camera 9 is mounted inside the enclosure 1 with the mounting system 11. FIG. 17 is a left side detail showing the left hand glove bezel 15.

Figure 5:
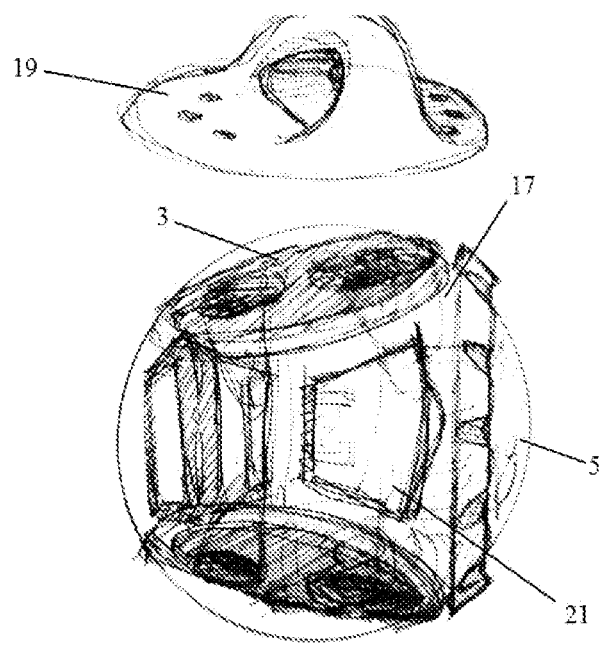
FIG. 5 is a top view of a universal underwater camera enclosure with one shroud depicted.
Figure 6:
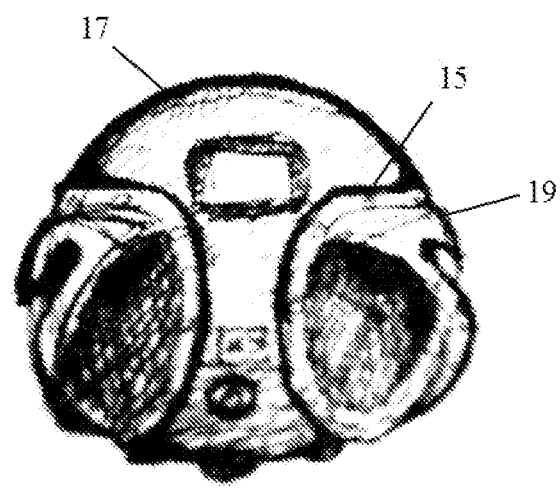
FIG. 6 is a back view of a universal underwater camera enclosure with hand shrouds.

FIG. 5 is a top view of a universal underwater camera enclosure with one shroud 19 depicted. Hand shroud 19 is fixed over glove 3. Pop-up style flash 21 is here recessed within the enclosure. FIG. 6 is a back view of a universal underwater camera enclosure with hand shrouds 19.

Figure 7:
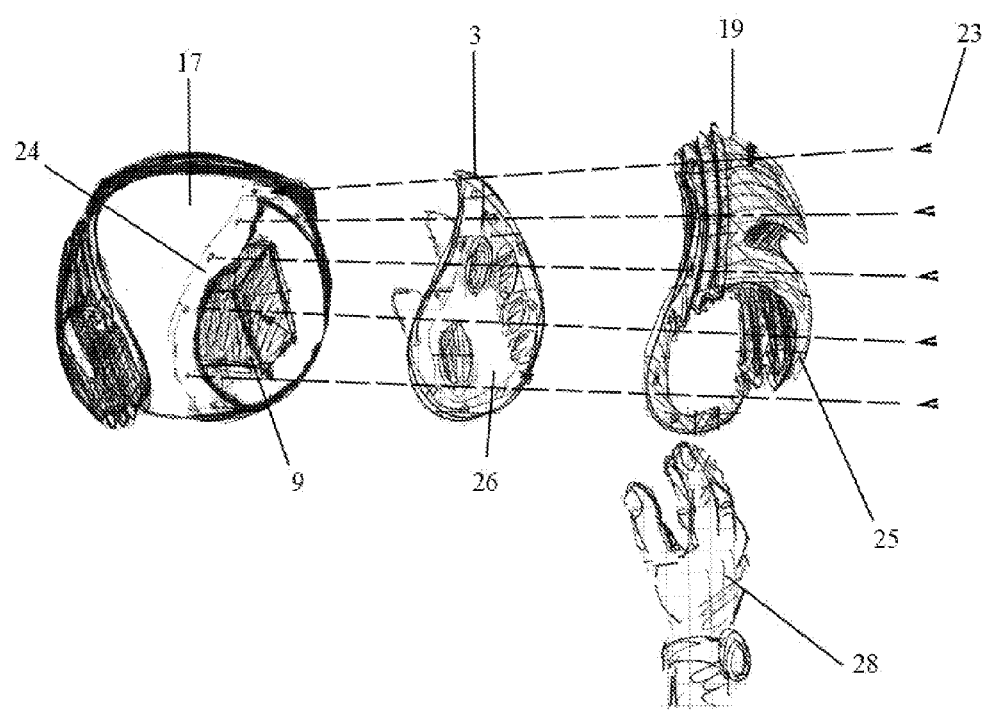
FIG. 7 is an exploded view of a universal underwater camera enclosure glove assembly and hand shroud.

FIG. 7 is an exploded view of a universal underwater camera enclosure glove assembly and hand shroud. Shell 17 is a clear polycarbonate plastic body. Tear-drop shaped cut out 24 in the shell 17 is where the glove 3 is attached. A camera 9 is shown within the enclosure. Silicone rubber inner glove 3 has a thicker silicone edge 26, which serves as water tight gasket. Rigid rubber outer hand shroud 19 has accordion style pleats 25 that flex to expand the opening for a user's hand 28. Stainless steel screws 23 attach the glove 3 and hand shroud 19 to the shell 17. Not shown in this figures is the bezel 15, which is the outermost feature. From innermost to outermost feature, the progression in this embodiment is housing, glove, shroud, bezel.

Figure 8:
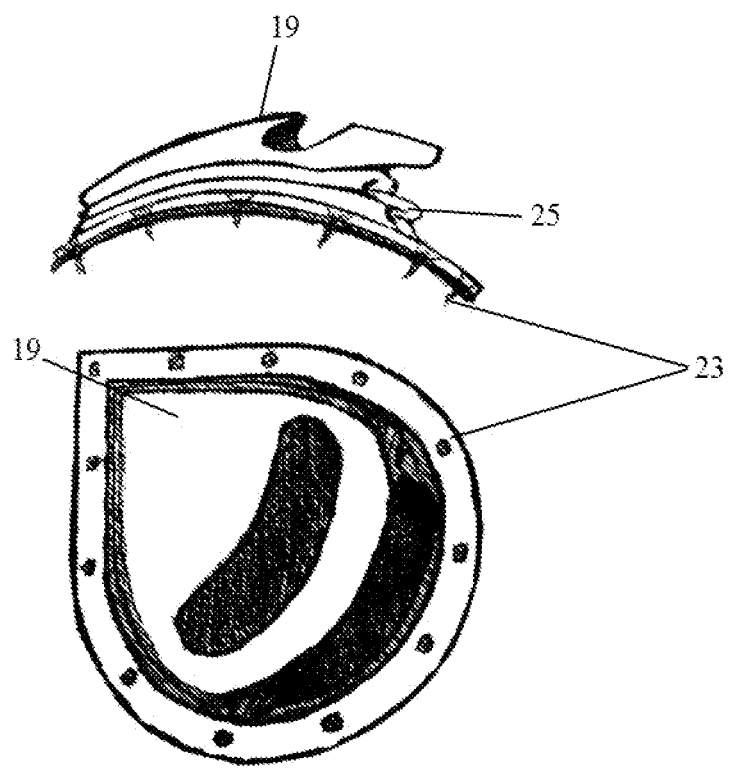
FIG. 8 is an exterior view of a glove assembly for a universal underwater camera enclosure.

FIG. 8 is an exterior view of a glove assembly for a universal underwater camera enclosure showing the hand shroud 19 with pleats 25 and screws 23.

Figure 9:
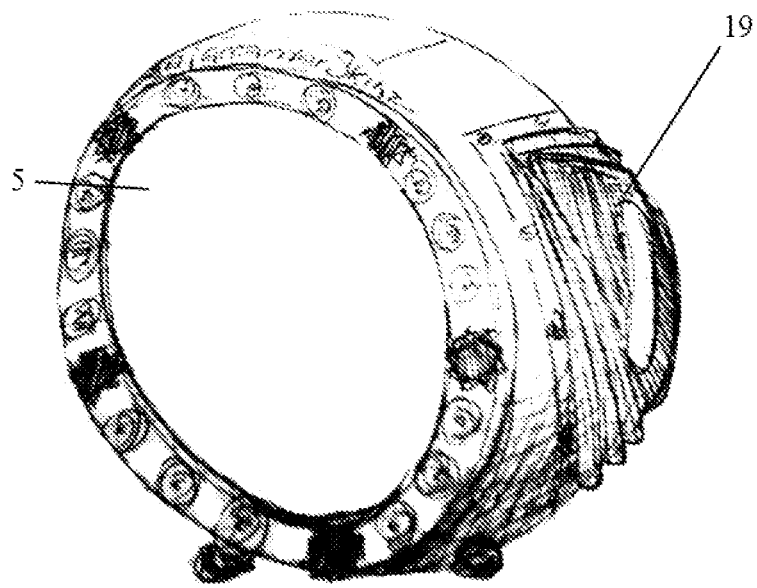
FIG. 9 is a front view of a universal underwater camera enclosure.

FIG. 9 is a front view of a universal underwater camera enclosure showing the lens 5 and hand shroud 19.

Figure 10:
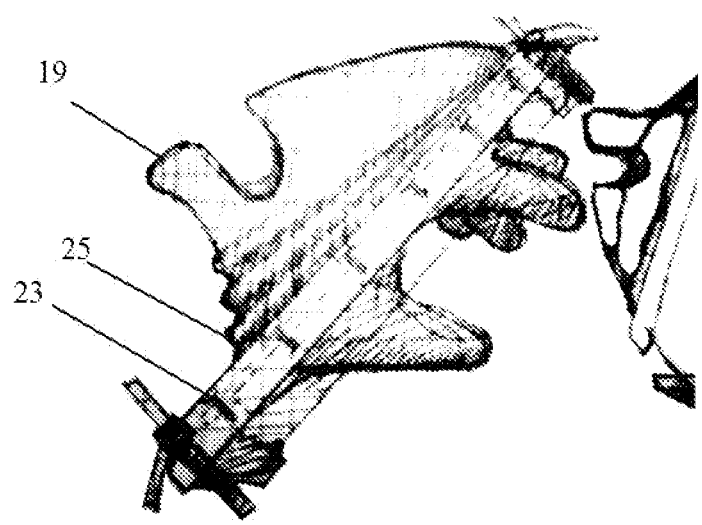
FIG. 10 is a hand shroud detail for a universal underwater camera enclosure.

FIG. 10 is a hand shroud detail for a universal underwater camera enclosure showing the shroud 19, pleats 25 and screws 23.

Figure 11:
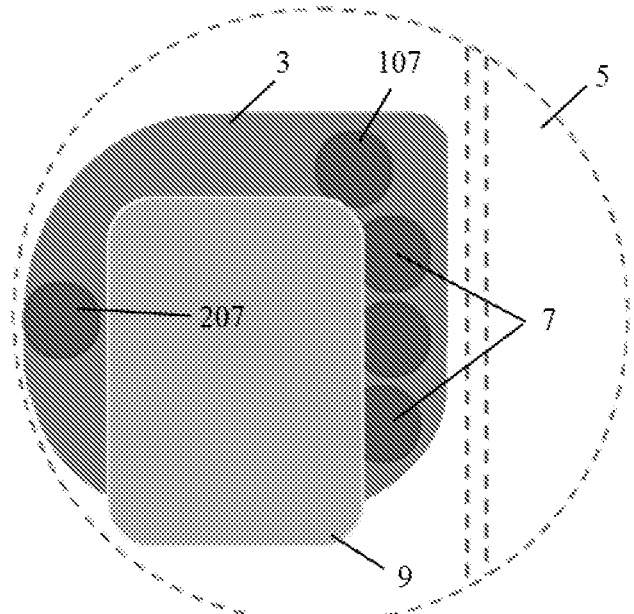
FIG. 11 is a side view diagram of a universal underwater camera enclosure.

FIG. 11 is a side view diagram of a universal underwater camera enclosure. Shell 17 and lens 5 are shown schematically. Glove 3 conforms to the tear-shaped cut-out in the shell 17. Camera 9 is positioned within the enclosure for accessibility from the glove 3. Fingers 7, 107, 207 of the glove 3 including thumb 207 and index finger 107 are positioned for easy camera manipulation. The surface of the glove 3 is flat except at the back side near thumb 207 where it is more rounded. The thumb 207 is deeper than the other fingers for deep accessibility within the enclosure.

Figure 12:
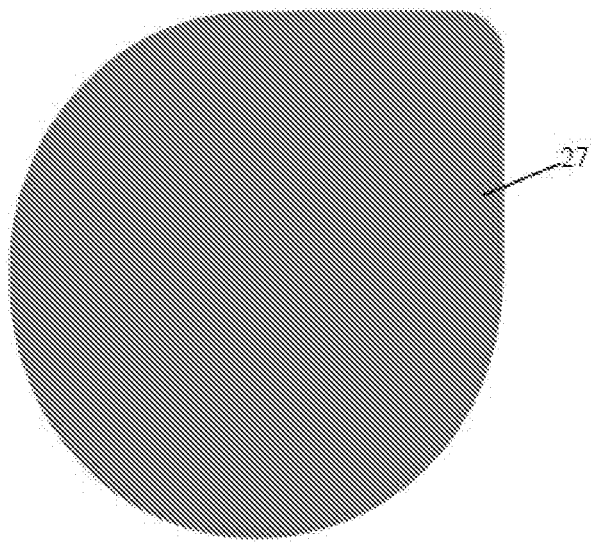
FIG. 12 is a side view diagram of a shell cut-out for a universal underwater camera enclosure.

FIG. 12 is a side view diagram of a shell cut-out 27 for a universal underwater camera enclosure.

Figure 13:
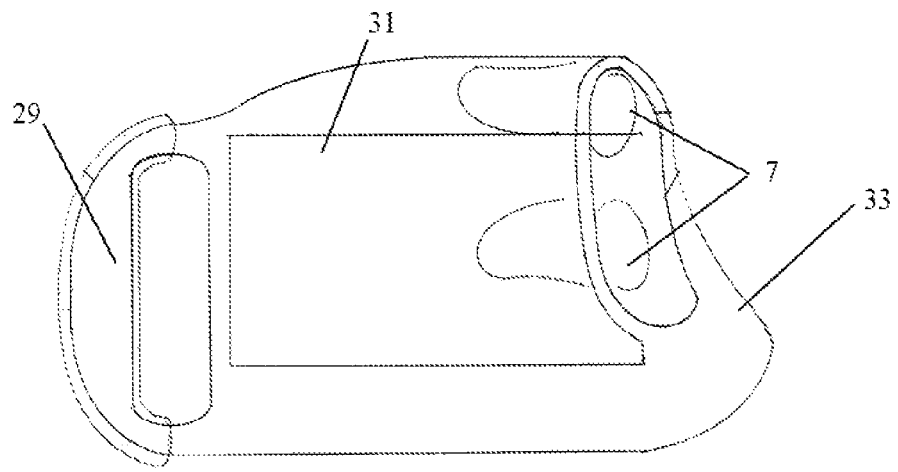
FIG. 13 is a back view of a universal underwater camera enclosure.

FIG. 13 is a back view of a universal underwater camera enclosure. Carrying handle 13 allows for easy carrying and stabilization and LCD window 31 for easy camera viewing. Forefinger and thumb 7 alone are inserted for manipulation while the remaining fingers grasp contoured grip 33.

Figure 14:
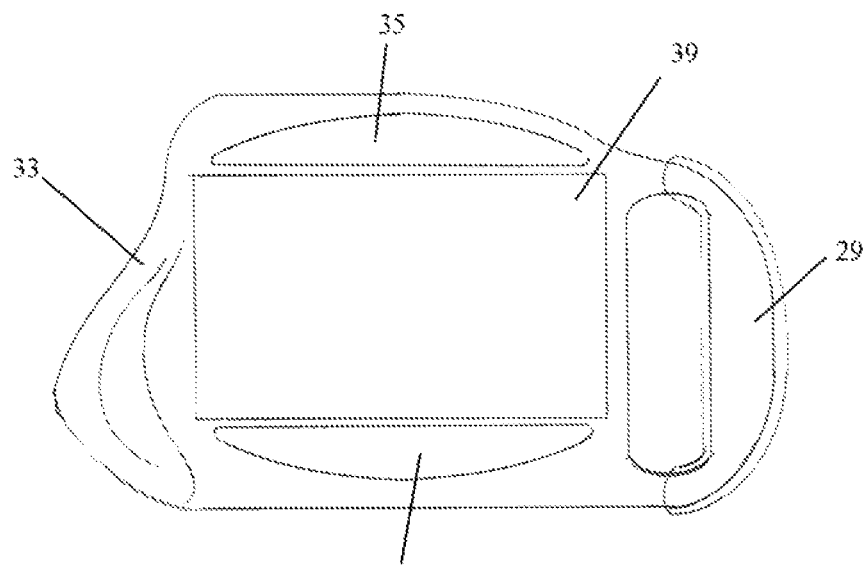
FIG. 14 is a front view of a universal underwater camera enclosure.

FIG. 14 is a front view of a universal underwater camera enclosure showing top and bottom LED lights 35, 37 respectively, lens window 39 and carrying handle 29 and contoured grip 33.

Figure 15:
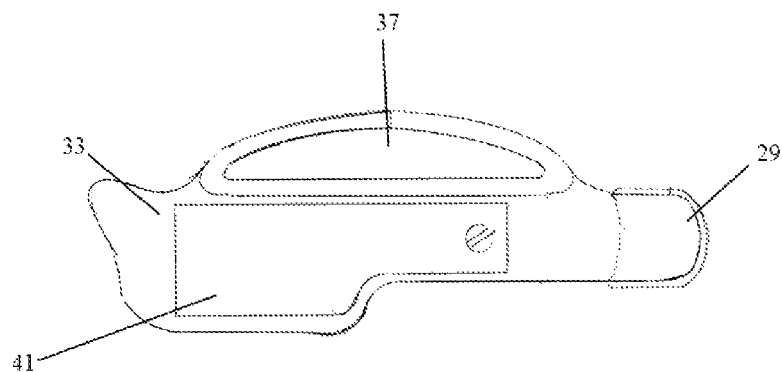
FIG. 15 is a bottom view of a universal underwater camera enclosure.

FIG. 15 is a bottom view of a universal underwater camera enclosure showing bottom LED light 37, access panel with watertight seal 41, carrying handle 29 and contoured grip 33.

Figure 16:
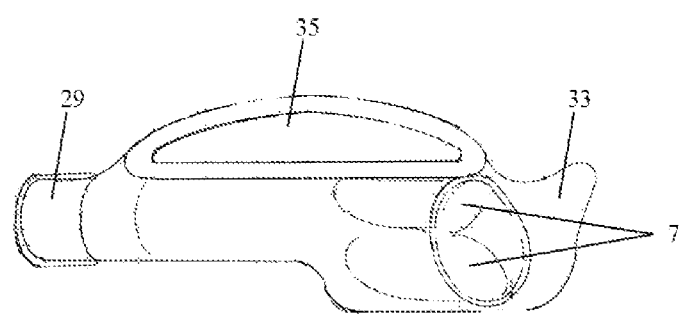
FIG. 16 is a top view of a universal underwater camera enclosure.

FIG. 16 is a top view of a universal underwater camera enclosure showing the top LED light 35, glove fingers 7, contoured grip 33 and carrying handle 29.

The waterproof camera housing market is mostly targeted to divers, many of whom were willing and able to pay the high price of an underwater camera enclosure designed to withstand depths of 130 feet or more. These housings range from $160 (for compact cameras) to over $4,000 (for digital SLR cameras). The new universal underwater camera housing appeals both to this existing market and to the recreational and adventure photographer who frequently needs to protect a digital camera from shallow water submersion and abrasion. The target audience is broad, offering an affordable alternative to campers, beach-goers, and water-sport enthusiasts like snorkelers, surfers, kayakers, and fishermen. This housing makes adventure photography affordable.

The existing market for underwater camera housings is a cross section of photography and diving—both of which are well established and have a passionate following. The underwater photography sector is growing rapidly and has international and multicultural market appeal. Market interest is also emanating from an increase in adventure travel and eco-conscious tourism. People are increasingly interested in nature, exploration, and exotic travel. A natural extension of this interest is to want to create photographs and videos to capture the moment. Most of these exotic environments are underwater or otherwise in places where photographic equipment is vulnerable to the elements.

Moreover, digital cameras and camcorders are becoming increasingly capable. The recent introduction of high definition video to cameras allows the amateur photographer to produce captivating video and still photos. This allows the amateur photographer access to very capable equipment.

The present universal housing design provides for incredible manufacturing efficiency. Instead of having to create a design for each new camera on the market, this single solution accommodates all cameras, old and new. Consequently, the housing is extremely price competitive.

Several photographers have emerged as leaders in the field, and, through viral marketing, are exposing their techniques to the photographer's community at large. Underwater photography is represented in several large and well established trade associations including Dive Equipment Manufacturing Association (DEMA) and the Photo Marketing Association (PMA).

The housings will be distributed through, for example, dive shops, cruise lines, beach supply, and photography shops. A key to their appeal is that the universal design minimizes the amount of inventory a retailer needs to carry. In the photography market, where digital cameras become obsolete within a year's time, the idea of a single housing that never becomes obsolete is compelling.

The invention is not limited to the particular embodiments described above in detail. Those skilled in the art will recognize that other arrangements could be devised, for example, variously shaped housings, housings for containing various equipment other than cameras, various arrangements and combinations of the housing parts, etc. While the invention has been described with reference to specific illustrative embodiments, modifications and variations of the invention may be constructed without departing from the scope of the invention.

We claim:

1. An underwater device protection apparatus, comprising:
an enclosure in which a device can be inserted, wherein said enclosure is a shell configured to be submerged underwater;
a see-through portion of the enclosure;
one or more glove assemblies attached to the enclosure and comprising a portion extending into the enclosure, which are configured to allow a user to manipulate the device therein without opening the enclosure;
wherein the portion extending into the enclosure is not a full glove and is configured to not encompass a user's entire palm when the user is manipulating the device an object in the enclosure, whereby an amount of unused space within the enclosure is minimized, reducing buoyancy.

2. The underwater device protection apparatus of claim 1, further comprising a mounting system that fixes the position of the device in the enclosure that attaches to a tripod mount receptor of the device and allows adjustment of the device position up and down, left and right, and forward and back.

3. The underwater device protection apparatus of claim 2, further comprising a tripod mount adapter that clamps to a device body and presents a tripod mount receptor for attaching to the mounting system.

4. The underwater device protection apparatus of claim 1, wherein the enclosure is spherical.

5. The underwater device protection apparatus of claim 1, further comprising a pressure equalization system attached to the enclosure, whereby an internal shell air pressure equivalent to external water pressure is maintained.

6. The underwater device protection apparatus of claim 5, wherein the pressure equalization system comprises a carbon dioxide reservoir or connection for a scuba tank and a pressure valve that releases gas from the carbon dioxide reservoir or scuba tank into the housing to increase internal shell air pressure.

7. The underwater device protection apparatus of claim 1, further comprising conductive material in the fingertip of one or more glove assembly tips, whereby a user may manipulate touch screens inside the enclosure.

8. The underwater device protection apparatus of claim 1, wherein the enclosure exhibits neutral buoyancy.

9. The underwater device protection apparatus of claim 1, further comprising a flash attached to the enclosure and operating independently of the device placed in the hollow of the shell.

10. The underwater device protection apparatus of claim 9, wherein the flash system comprises LED lights and an external button for triggering the flash and is powered by an energy storage device.

11. The underwater device protection apparatus of claim 1, further comprising modular lens pods for replacing all or a portion of the see-through portion and accommodating various lenses.

12. The underwater device protection apparatus of claim 1, wherein the see-through portion is an optical lens.

13. The underwater device protection apparatus of claim 1, wherein the enclosure is made of clear polycarbonate.

14. The underwater device protection apparatus of claim 1, further comprising one or more hand shrouds over one or more of the glove assemblies that protects the glove assemblies and provides a rigid external surface upon which to grab.

15. The underwater device protection apparatus of claim 1, further comprising a bezel around one or more cut-out holes in the enclosure and fasteners, wherein the glove assemblies comprise perimeter lips that are secured to the enclosure by the bezel and the fasteners.

16. The underwater device protection apparatus of claim 15, wherein the cut-out holes are teardrop-shaped.

17. The underwater device protection apparatus of claim 16, wherein the cut-out holes are covered by the glove assemblies, wherein one or more fingers extend into the enclosure at the side of the cut-out nearest a front of the enclosure and the fingers comprise a thumb that extends into the enclosure at the side of the cut-out nearest a back of the enclosure, whereby sufficient range of motion is allowed to a user to accommodate all of the device's controls.

18. The underwater device protection apparatus of claim 1, further comprising a clasp securing the see-through portion to the enclosure, wherein the see-through portion is attached to the enclosure in a hinged manner and wherein the see-through portion can be moved to an open position to allow the device to be inserted into the enclosure through a resulting opening.

19. The underwater device protection apparatus of claim 1, further comprising an access panel attached to the enclosure in a hinged manner, wherein the access panel can be opened to insert the device into the enclosure.

* * * * *